F. J. MILLER.
VALVE LOCK.
APPLICATION FILED JULY 10, 1911.

1,215,958.

Patented Feb. 13, 1917.

INVENTOR.
Frank J. Miller
by
Owen, Owen & Crampton

UNITED STATES PATENT OFFICE.

FRANK J. MILLER, OF FOSTORIA, OHIO.

VALVE-LOCK.

1,215,958.   Specification of Letters Patent.   Patented Feb. 13, 1917.

Application filed July 10, 1916. Serial No. 108,370.

*To all whom it may concern:*

Be it known that I, FRANK J. MILLER, a citizen of the United States, and a resident of Fostoria, in the county of Seneca and State of Ohio, have invented a certain new and useful Valve-Lock; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to valve locks. It relates not only to means for locking the cock of the valve to prevent rotation thereof but also to means for preventing loosening of the cocks whereby leakage would be otherwise produced through the valve. The invention is particularly useful in connection with valves or gates which are commonly located in pipes connecting oil barrels or oil tanks. A great deal of trouble has been experienced by reason of the fact that owners of petroleum wells are tempted to open valves for the purpose of misleading purchasers of the petroleum as to the correct quantity of the petroleum produced by one or more wells. The applicant has produced a means which will not only lock the stop cock from turning but will also prevent anyone tampering with the nut or bur which is commonly used on valves to hold the cocks in position. It has been found in this connection that the burs have been loosened from the casing by turning them in the studs of the cocks and then by striking the end of the stud the cock will be forced forward against any locking means that may be provided, and petroleum will constantly leak by the valve and in time will cause considerable loss.

The invention may be modified by those skilled in the art and embodied in structures of various forms, all of which come within the purview of the claims hereinafter appended. A construction containing the invention is contained in the following specification, in which—

Figure 1:
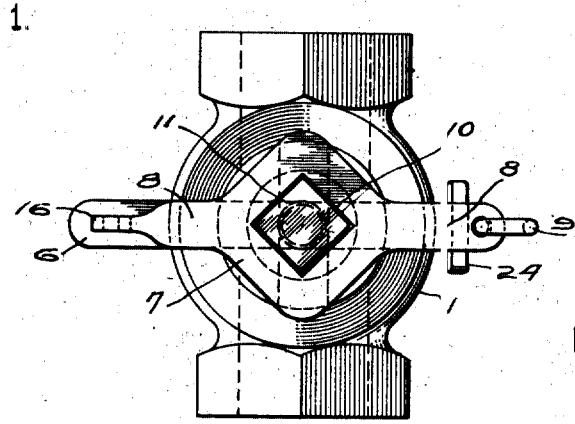
Figure 2:
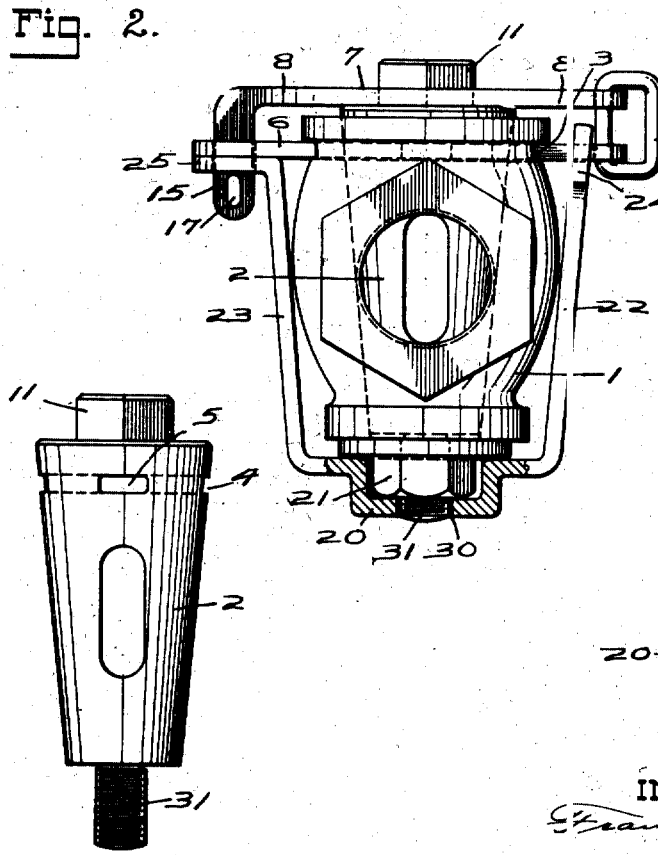
Figure 3:
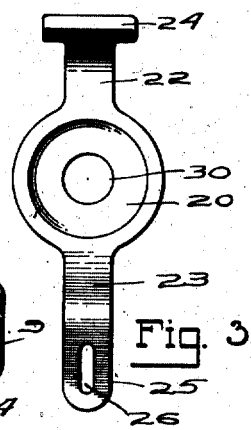
Figure 4:
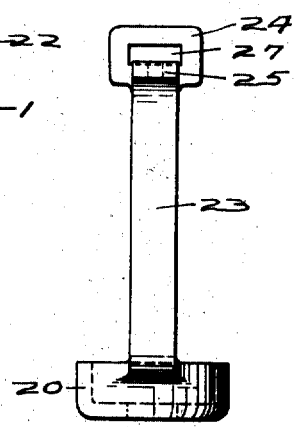
Figure 5:
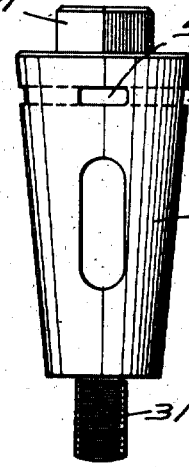

Figure 1 illustrates the top view of the valve having the locking means applied thereto. Fig. 2 illustrates an end view of the valve. Fig. 3 illustrates a cap for covering the bur or nut which secures the cock in its seated position in the valve casing. Fig. 4 is a side view of the cap shown in Fig. 3. Fig. 5 illustrates the cock used in the valve.

1 indicates the valve casing. 2 is the cock located within the valve casing. The valve casing is provided with openings 3 and the cock is provided with openings 4 and 5. A bar or strip of metal 6 may be inserted through the openings 3 and 4 of the valve casing and the cock, respectively, to lock the valve open, or the strip 6 may be inserted through the openings 3 and 5 of the casing and the cock to lock the valve closed. The strip 6 is connected to a plate 7 having arms 8 by means of a link 9 which passes through one end of the strip 6 and one of the arms 8. The plate 7 is provided with a square opening 10 to fit over the square head 11 of the cock 2 to prevent rotation of the cock with respect to the casing 1.

One of the arms 8 is provided with a right angular portion 15 which is flattened in a plane at right angles to the plane of the plate 7. The strip 6 is provided with an opening 16 through which the right angular portion 15 may be inserted. The right angular portion 15 is also provided with a slot 17 into which may be inserted a sealing strip to which may be secured a seal.

This provides a means for preventing rotation of the cock 2 with respect to the casing, but in order to prevent tampering with the bur or nut on the cock to prevent loosening of the cock relative to the casing and consequently to prevent leakage through the valve, a cap 20 is provided which fits over the nut 21. The cap 20 is provided with the arms 22 and 23. The end of the arm 22 is provided with an enlargement 24 in which is located a rectangular opening 27 through which the rod or strip 6 may be inserted when it is inserted in the openings 3 and 4 or 5, according to whether the valve is to be locked open or closed. The end of the arm 23 is provided with a right angular portion 25 having an opening 26 through which the right angular portion 15 of the arm 8 forming part of the locking plate 7 may be inserted. The opening 26 is adapted to register with the opening 16 formed in the end of the strip 6. In order that the cap 20 may set down close to and around the nut 21, an opening 30 may be formed in the cap 20, into which the stud 31 may be inserted. This will also operate to hold the cap 20 in its proper position with respect to the valve casing. By this arrangement the bur 21 will be closely covered and the valve protected from any tampering.

The construction may be modified by those skilled in the art, and yet such modifications will contain the invention set forth in the claims hereinafter appended.

Having thus described my invention, what I claim as new, and desire to secure by Letters Patent, is—

1. In a lock for a valve, a U-bar having a cap for covering the nut located on the stud of the valve, and a bar extending through the valve casing, the cock of the valve, and the U-bar.

2. In a valve lock, the combination of a U-bar having a cap for covering the nut located on the stud of the cock of the valve, a bar extending through the U-bar, the casing and the cock, and means locking the U-bar and the bar together.

3. In a valve lock, the combination of a U-bar having a cap for covering the nut located on the stud of the cock of the valve, a bar extending through the U-bar, the casing and the cock, and means locking the U-bar and the bar together.

4. In a valve lock, the combination of a cap having arms located on each side of the casing, a bar extending through one of the arms, and a plate linked to the bar and surrounding and locking the head of the cock and having an arm extending through the bar and the remaining arm of the cap for locking the parts together.

In testimony whereof, I have hereunto signed my name to this specification.

FRANK J. MILLER.